C. F. MATTINGLY.
AUTOMATIC SAFETY VALVE FOR WATER GAGES.
APPLICATION FILED APR. 10, 1920.

1,362,257.

Patented Dec. 14, 1920.

Inventor
C. F. Mattingly

By Watson E. Coleman,
Attorney

UNITED STATES PATENT OFFICE.

CHARLES F. MATTINGLY, OF PUXICO, MISSOURI.

AUTOMATIC SAFETY-VALVE FOR WATER-GAGES.

1,362,257.  Specification of Letters Patent.  Patented Dec. 14, 1920.

Application filed April 10, 1920. Serial No. 372,863.

*To all whom it may concern:*

Be it known that I, CHARLES F. MATTINGLY, a citizen of the United States, residing at Puxico, in the county of Stoddard and State of Missouri, have invented certain new and useful Improvements in Automatic Safety-Valves for Water-Gages, of which the following is a specification, reference being had to the accompanying drawings.

This invention relates to automatic safety valves for water gages whereby the water gage is automatically shut off or opened as desired, and automatically shut off should the glass gage become broken, and pertains to that class of invention illustrated in Patent 1,060,472, April 29th, 1913.

An object of the invention is to provide a valve of this character capable of being operated either by pressure from a boiler or manually.

Another object is to provide a valve of this character capable of being used on boilers positioned a distance from the ground or floor so that the valve may be instantly opened or closed without requiring the use of elevating means.

Another object is to provide a device of this character including an auxiliary outlet in which a warning valve is disposed, said valve permitting steam to escape at certain times from the auxiliary outlet to warn the operator that the valves are not in the proper position.

With these and other objects in view the invention consists in the improved construction and arrangement of parts to be hereinafter more particularly described, fully claimed and illustrated in the accompanying drawings, in which:

Figure 1:
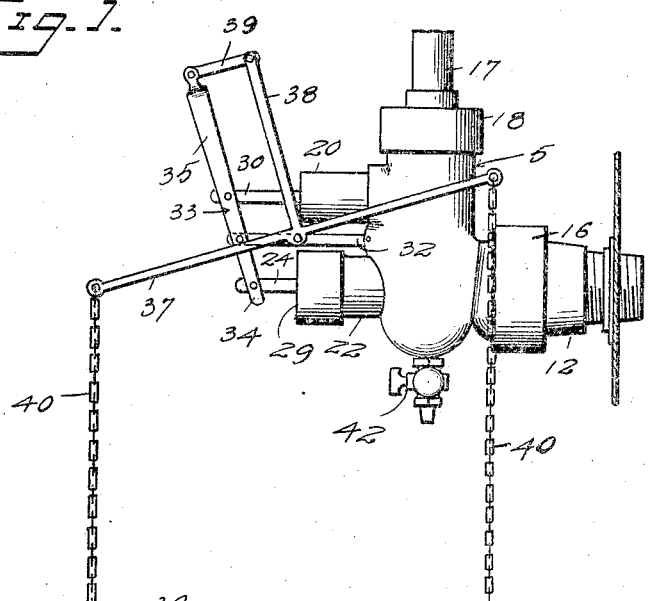
Figure 1 is a vertical elevation of the valve constructed in accordance with an embodiment of the invention.
Figure 2:
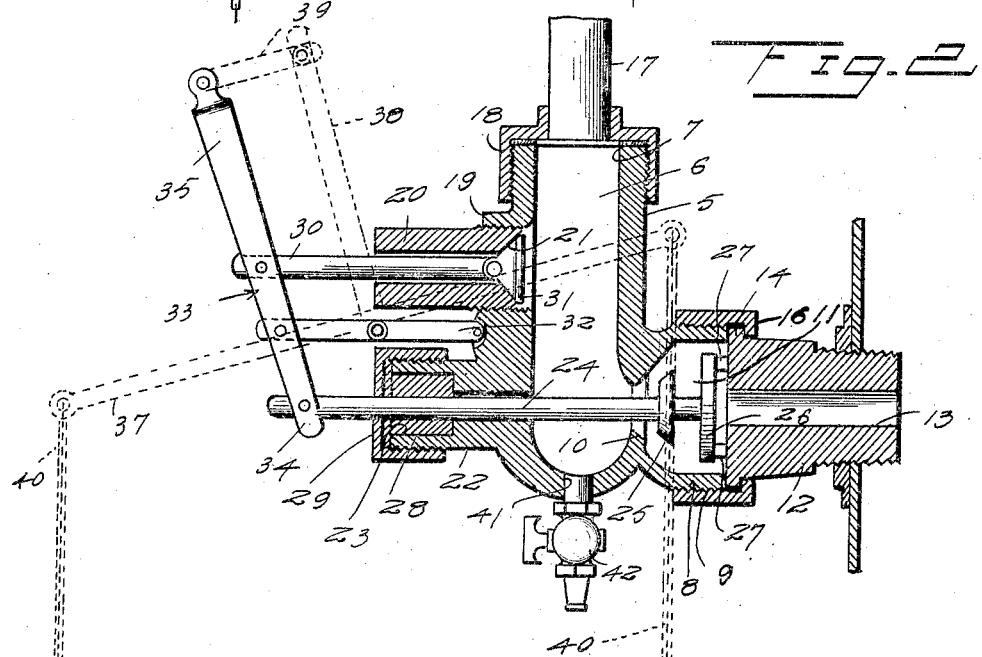
Fig. 2 is a sectional view of the construction shown in Fig. 1.

Referring to drawings, 5 designates a valve casing having a central chamber 6 and an open end 7. Projecting from one side of the valve is an extension 8 which is exteriorly threaded as at 9 and has a valve seat 10 formed at its junction with the casing. This extension forms the inlet member of the valve and also provides a valve chamber 11. A nipple 12 including a passage 13, is disposed in communication with the boiler (not shown), the nipple including a flange 14 with which a coupling ring 16 is engaged. The coupling ring is interiorly threaded and is adapted to connect the valve with the nipple, the end of the nipple serving to partially close the inlet member. A gage glass 17 is held in communication with the open end 7 of the casing by means of packing and a coupling ring 18, the water or fluid under pressure passing from the boiler through the inlet into the gage glass.

The casing 5, also includes an auxiliary outlet 19 which projects from the side of the valve casing opposite to that of the inlet extension 8 and in offset relation to said extension. A bushing 20 is threaded into the auxiliary outlet 19 and includes a valve seat 21. An extension 22 projects from and is formed integral with the casing 5 diametrically opposite the extension 8, this extension including a chamber 23.

Slidably mounted in the extension 22 and projecting into the extension 8 is a valve stem 24, the valve stem within the extension 8 being provided with a valve 25 adjacent its end, adapted to engage the valve seat 10, a pressure plate 26 being secured to the end of the stem within the extension and adapted at certain times to engage lugs 27 projecting from the nipple so as to permit the escape of liquid or fluid pressure around the plate. The other end portion of the stem 24 extends through the extension, packing 28 being disposed around the stem within the chamber 23. A cap 29 is threaded on the extension and is provided with an opening through which the stem passes. By this means escape of liquid or fluid pressure around the valve stem through the extension 22 is prevented.

Slidably mounted in the bushing 20 is a valve stem 30 which projects into the chamber 6 of the valve casing. Pivoted to the end of the valve stem 30 is a valve 31 adapted to engage the valve seat 21. The bore of the bushing 20 is larger than the valve stem 30 so that in this way fluid pressure is permitted to pass through the bushing, when the valve 31 is disengaged from the valve seat so as to produce a warning sound when the valves are not properly positioned. Pivoted to the valve casing 5 between the bushing 20 and extension 22 is a supporting link 32 to the outer end of which a connecting link 33 is pivoted. It will be noted that the connecting link is pivoted to the supporting link adjacent its end 34. The end of the valve stem 24 is pivoted to the end 34 of the connecting link, while the end of the valve stem 30 is pivotally connected to the connecting link 33 adjacent its intermediate portion. The end portion 35 of the connecting link 33 projects beyond the valve stem 30 and has its extremity bifurcated the purpose of which will be hereinafter described.

A rock lever 37 is pivoted at its intermediate portion to the intermediate portion of the supporting link 32, and includes an arm 38 which projects from the intermediate portion of the rock lever in angular relation thereto. A link 39 is pivotally connected at one end to the arm 38 and is pivotally connected at its other end between the bifurcated end of the lever 33. In view of this novel pivotal arrangement of the valve stems, connecting link and rock lever, it is impossible for the mechanism to bind or become difficult to operate. Each end of the rock lever 37 is provided with an opening for the reception of flexible operating means such as the chains 40. By this arrangement the valve can be positioned a considerable distance from the ground or floor and still be within convenient reach of the operator in view of the chains 40. The valve casing 5 is also provided with an outlet 41 in which a drain cock 42 is disposed.

When it is desired to close the valve, the chain nearest the extension 8 is pulled downwardly. This causes the arm 38 of the rock lever to force the end 34 of the connecting link 35 toward the valve casing thereby forcing the valve 31 inwardly of the casing and causing the valve stem 24 to move the valve 25 into engagement with the valve seat 10 thereby cutting off the supply from the boiler. During this movement, that is, before the valve 25 engages the valve seat 10, steam is permitted to escape through the bushing 20 thereby warning the operator that the valves are not in their proper position. As soon as the valve 25 engages the valve seat, the supply is cut off from the boiler and the escape of steam or water through the bushing 20 is stopped regardless of the position of the valve 31. In view of this novel arrangement, it is impossible for the valve 25 to be partially opened or closed without the warning valve notifying the operator.

To manually open the valve, the other chain of the rock lever is pulled downwardly thereby causing the arm 39 of the end portion 35 of the connecting link to force the valve stem and valve 25 inwardly until the valve 31 engages the valve seat 21. The valve 31 again permits the escape of steam as a warning during the operation of the valves, and as long as steam escapes from the bushing 20 the valves are not properly positioned. When the valve 31 is snugly engaged with the valve seat 21 the pressure plate 26 is also disposed in engagement with the lugs 27. The valve is then opened so that the water from the boiler may pass through the valve casing into the glass gage. Should the glass gage 17 become broken, the pressure from the boiler will cause the valve 25 to move toward the valve seat 10 during which time the pressure will escape through the bushing, again issuing a warning sound until the valve 25 engages the valve seat, thereby shutting off the supply from the boiler. As all of the operating parts of the valves 31 and 25 are pivotally mounted, the valves can be readily operated in the manner above described without danger of friction interfering with their movements.

What is claimed is:

1. A device of the character described comprising a valve casing having inlet and outlet ports, valves for closing certain of said ports, a gage glass disposed in another of said ports, and means connecting said valves to each other for alternately opening and closing the ports.

2. A device of the character described comprising a valve casing having inlet and outlet ports, valves disposed in certain of said ports, a gage glass extending from another of said ports, means carried by the casing and operatively connecting the valves to each other, and operating means carried by the casing and pivoted to the first mentioned means for opening one of the valves and closing the other valve simultaneously.

3. A device of the character described comprising a valve casing including a chamber, said chamber having an extention connected to a source of liquid, a valve in said extension, a gage glass carried by the casing, an auxiliary outlet for said casing, a valve in said outlet, a connecting member carried by the casing and operatively connecting said valves to each other whereby movement of one valve will actuate the other valve.

4. A device of the character described comprising a valve casing including a chamber, an inlet port projecting from said casing, means connecting said inlet port to the boiler and an auxiliary outlet port projecting from the opposite side of the casing, a gage glass carried by and communicating with the chamber, a valve stem extending through said casing into said inlet port, a valve on the stem within the inlet port, a valve stem extending through said auxiliary outlet, a valve on the end of said stem for closing the outlet port, means carried by the casing for pivotally connecting said valve stems to each other, and manually operable means connected to the first mentioned means for alternately opening and closing said outlet and inlet ports.

5. A device of the character described comprising a valve casing including a chamber, an inlet projecting from said casing, means connecting said inlet to the boiler and an auxiliary outlet projecting from the opposite side of the casing, a gage glass carried by and communicating with the chamber, a valve stem extending through said casing into said inlet, a valve on the stem within the inlet, a valve stem extending through said auxiliary outlet, a valve on the end of said stem for closing the outlet, means carried by the casing for pivotally connecting said valve stems to each other, a rock lever pivotally mounted on the casing and pivoted to said first mentioned means, and flexible means extending from the end of said lever for rocking the same to operate the valves.

6. A device of the character described comprising a valve casing including a chamber, an inlet projecting from said casing, means connecting said inlet to the boiler and an auxiliary outlet projecting from the opposite side of the casing, a gage glass carried by and communicating with the chamber, a valve stem extending through said casing into said inlet, a valve on the stem within the inlet, a valve stem extending through said auxiliary outlet, a valve on the end of said stem for closing the outlet, a link pivoted adjacent one end to the casing and pivoted to the valve stems, a rock lever pivoted to said casing, an arm projecting from said lever, a link pivotally connecting said arm to the end of the first mentioned link and means depending from the ends of said rock lever for actuating the same.

In testimony whereof I hereunto affix my signature.

CHARLES F. MATTINGLY.